United States Patent
Kim

(10) Patent No.: US 9,405,129 B2
(45) Date of Patent: Aug. 2, 2016

(54) STRUCTURE OF EYEGLASS FRAME

(71) Applicant: Jungwoo Kim, Pleasanton, CA (US)

(72) Inventor: Jungwoo Kim, Pleasanton, CA (US)

(*) Notice: Subject to any disclaimer, the term of this patent is extended or adjusted under 35 U.S.C. 154(b) by 0 days.

(21) Appl. No.: 14/449,114

(22) Filed: Jul. 31, 2014

(65) Prior Publication Data

US 2015/0036098 A1 Feb. 5, 2015

Related U.S. Application Data

(60) Provisional application No. 61/861,429, filed on Aug. 2, 2013.

(51) Int. Cl.
| | |
|---|---|
| *G02C 5/02* | (2006.01) |
| *G02C 5/14* | (2006.01) |
| *G02C 5/22* | (2006.01) |
| *G02C 5/12* | (2006.01) |
| *G02C 5/10* | (2006.01) |

(52) U.S. Cl.
CPC ............ *G02C 5/2209* (2013.01); *G02C 5/10* (2013.01); *G02C 5/122* (2013.01); *G02C 5/146* (2013.01); *G02C 5/229* (2013.01); *G02C 2200/12* (2013.01); *G02C 2200/22* (2013.01)

(58) Field of Classification Search
CPC .......... G02B 5/008; G02B 5/10; G02B 5/146; G02B 5/229; G02B 5/2209; G02C 5/008; G02C 5/10; G02C 5/146; G02C 5/229; G02C 5/2209
USPC ........... 351/41, 83, 87, 88, 93, 103, 108, 109, 351/120, 121, 124–135, 153, 116; D16/300, 319, 320
See application file for complete search history.

(56) References Cited

U.S. PATENT DOCUMENTS

| | | | |
|---|---|---|---|
| 2,622,477 A | 12/1952 | Bechtel | |
| D217,028 S * | 3/1970 | Weissman | ........................ 16/319 |
| 4,178,080 A * | 12/1979 | Elder | ..................... G02C 5/124 |
| | | | 351/128 |
| 4,787,731 A | 11/1988 | Rogers | |
| 6,116,733 A | 9/2000 | Krumme et al. | |
| 6,554,422 B2 | 4/2003 | Bell | |
| 7,101,038 B2 * | 9/2006 | Miceli | ..................... G02C 5/005 |
| | | | 351/111 |
| 7,175,275 B2 | 2/2007 | Ifergan | |
| 8,496,329 B2 | 7/2013 | Spivey et al. | |
| 2008/0130401 A1 | 6/2008 | Belanger et al. | |
| 2013/0000077 A1 | 1/2013 | Thompson | |

FOREIGN PATENT DOCUMENTS

WO    WO 2010/003143 A1    1/2010

OTHER PUBLICATIONS

USPTO, ISA/US, "International Search Report and Written Opinion" in PCT Application No. PCT/US2014/049499, Dec. 11, 2014, 8 pages.

* cited by examiner

*Primary Examiner* — Darryl J Collins
(74) *Attorney, Agent, or Firm* — Kang S. Lim

(57) ABSTRACT

Provided is an eyeglass frame with a symmetrical structure. The eyeglass frame includes an earpiece frame, a main body, a hinge, and a support frame. The earpiece frame has a bar-shaped structure in which a width and an angle thereof vary according to the length thereof to be placed on the ear of a user. The main body is connected to the earpiece frame through a hinge, serves as a pivot that pivots on the hinge, and has an inner circumference of a closed curve receiving a lens. The hinge allows the earpiece frame to be inwardly folded toward the main body through pivoting of a predetermined angle. The support frame is disposed under the main body along an outer circumference of the main body and is spaced from the main body by a predetermined interval.

10 Claims, 26 Drawing Sheets

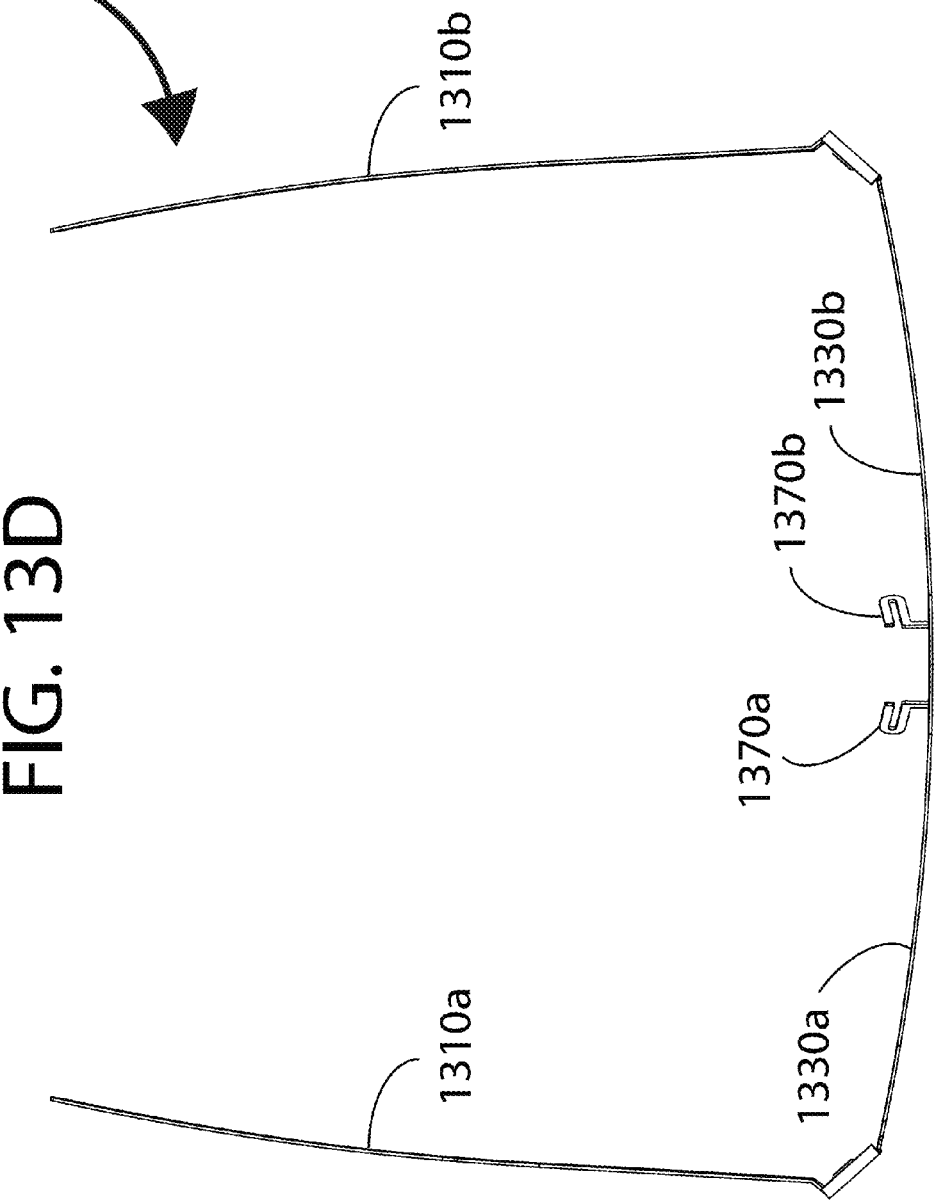

STRUCTURE OF EYEGLASS FRAME

CROSS REFERENCE TO RELATED APPLICATIONS

This U.S. non-provisional application claims the benefit of provisional application No. 61/861,429 filed on Aug. 2, 2013, entitled "Structure of Eyeglass Frame", which application is incorporated herein in its entirety by this reference.

BACKGROUND

The present disclosure herein relates to a structure of an eyeglass frame, and more particularly, to a structure of an eyeglass frame which includes an improved nose pad structure to allow an eyeglass not to slide regardless of a nose height.

Generally, a typical eyeglass frame includes a main body and two temples. The temples are pivotably coupled to brackets disposed on both sides of the main body through a joint such as a hinge. The main body includes a pair of rims for holding lenses and a bridge for connecting the pair of rims. Also, a nose pad is coupled to the inside of the main body.

When wearing an eyeglass, the nose pads are placed on both sides of the nose, and the tips of the temples are placed on the ears. In this case, the total weight of the main body is applied to the nose through the nose pad. On the other hand, while the length of the nose pad needs to be increased for a user having a small nose, a nose pad connection having a uniform length is being currently used to connect the main body and the nose pad. Furthermore, as described above, since an eyeglass has a structure in which two temples are horizontally folded, a user forcibly bends the temples in the vertical direction to use the eyeglass.

It is therefore apparent that an urgent need exists for improved eyeglass frames made from stamped metal components that is lightweight, configurable and collapsible.

SUMMARY

To achieve the foregoing and in accordance with the present invention, the present disclosure provides a structure of an eyeglass frame which includes an improved nose pad structure to allow an eyeglass not to slide regardless of a nose height. The present disclosure also provides a structure of an eyeglass frame which provides flexibility to the eyeglass frame itself, by modifying a typical structure in which temples are horizontally folded and providing a rotary structure to an earpiece frame corresponding to the tip of the temple. The present disclosure further provides a structure of an eyeglass frame which has a simple structure without a screw to remove inconvenience due to a loss of the screw in a hinge structure of a typical eyeglass.

Embodiments of the inventive concept provide an eyeglass frame with a symmetrical structure, including: an earpiece frame having a bar-shaped structure in which a width and an angle thereof vary according to the length thereof to be placed on an ear of a user; a main body connected to the earpiece frame through a hinge, serving as a pivot that pivots on the hinge, and having an inner circumference of a closed curve receiving a lens; the hinge allowing the earpiece frame to be inwardly folded toward the main body through pivoting of a predetermined angle; and a support frame disposed under the main body along an outer circumference of the main body and spaced from the main body by a predetermined interval.

The predetermined interval may range from about 0.5 mm to about 1 mm.

The main body may include: a first main body receiving a lens for correcting eyesight of a right eye of a user; and a second main body receiving a lens for correcting eyesight of a left eye of the user.

The eyeglass frame may further include a main body bridge disposed over the support frame, having an inner circumference of a trapezoidal shape in which an upper side is shorter than a lower side, and connecting the first main body and the second main body.

The eyeglass frame may further include an extension member extending from a center of a lower end of the support frame and connected to a nose pad, wherein the extension member has a vertical length of about 1 mm to about 2 mm.

The nose pad may be connected to a lower end of the extension member, and may have a parabolic shape in which a start point and an end point thereof are downwardly located at both sides of the extension member, respectively.

A curvature of a portion of the nose pad supported by the nose may be greater than a curvature of an outer circumference at a lowermost portion of the main body bridge.

The hinge may include: a first hinge plate extending from the earpiece frame and having a rotary hole formed at a center thereof; a second hinge plate extending from the main body and having a rotary hole formed at a center thereof; a first elastic slit formed by partially cutting the second hinge plate at a point where a first rotary member inserted into the rotary hole of the second hinge plate is disposed and preventing the point where the first rotary member is disposed from being damaged by an external force during a rotation of the first rotary member; and a second elastic slit formed by partially cutting the second hinge plate at a point where a second rotary member inserted into the rotary hole of the second hinge plate is disposed and preventing the point where the second rotary member is disposed from being damaged by an external force during a rotation of the second rotary member.

The predetermined angle may be about 360 degrees.

When the eyeglass frame is placed on a horizontal plane, the first rotary member may be inserted into a lower end portion of the rotary hole of the second hinge plate to allow the first hinge plate to adhere closely to the second hinge plate.

When the eyeglass frame is placed on a horizontal plane, the second rotary member may be inserted into an upper end portion of the rotary hole of the second hinge plate to allow the first hinge plate to adhere closely to the second hinge plate.

The hinge may include: a first hinge plate extending from the earpiece frame and having a rotary hole formed at a center thereof; a second hinge plate extending from a lower portion of the main body on a vertical plane and connected to a first extension plate that is inwardly folded; and a third hinge plate spaced from the second hinge plate on a vertical plane, extending from an upper end portion of the main body, and connected to a second extension plate that is inwardly folded. Here, the first hinge plate and the second extension plate may be sequentially stacked on a rear surface of the first extension plate, and a center of the first extension plate may be penetrated by a rotary body disposed in the first hinge plate.

The rotary body may penetrate the third hinge plate.

The predetermined angle may be about 180 degrees.

The nose pad may be configured such that the orientation thereof is adjustable forward or backward about the extension member, and the width of the parabolic shape thereof is adjustable in order to adjust a nose height.

The hinge may include: a first hinge plate extending from the earpiece frame and having a rotary hole formed at a central portion thereof, and has the shape of a circular rim; a second hinge plate extending from the body, and having a rotary hole perforated at a central portion thereof; two first rotary members formed in the upper portions of the inner circumference of the first hinge plate having the shape of a circular rim, the first rotary members being inserted into the second hinge plate; and one second rotary member formed in the lower portion of the inner circumference of the first hinge plate in contrast to the first rotary member, the second rotary member being inserted into the second hinge plate.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 13B is a perspective view of the eyeglasses of FIG. 13A, with the earpiece frames folded in;

FIG. 13D is a top view of the eyeglasses of FIG. 13A, with the earpiece frames folded out;

FIG. 13E is a top view of the eyeglasses of FIG. 13A, with the earpiece frames folded in;

DETAILED DESCRIPTION OF THE EMBODIMENTS

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
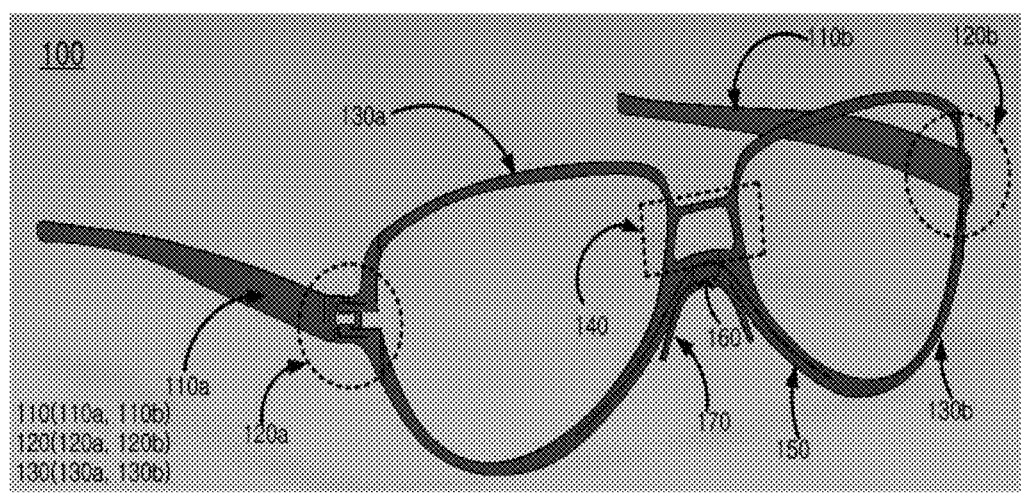
FIG. 1 is a perspective view illustrating a structure of an eyeglass frame according to an embodiment.
Figure 2:
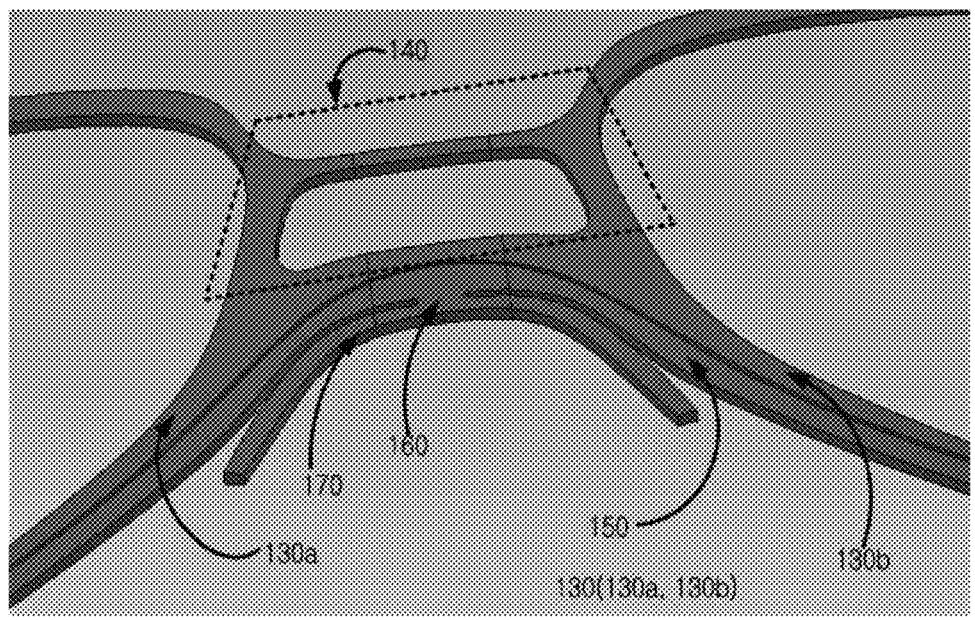
FIG. 2 is a view illustrating a nose pad of the eyeglass frame of FIG. 1.

To facilitate discussion, FIG. 1 is a perspective view illustrating a structure of an eyeglass frame 100 according to an embodiment. FIG. 2 is a view illustrating a nose pad of the eyeglass frame 100 of FIG. 1. Referring to FIGS. 1 and 2, the eyeglass frame 100 may include an earpiece frame 110, a hinge 120, a main body 130, a main body bridge 140, a support frame 150, an extension member 160, and a nose pad 170.

The earpiece frame 110, which are temples of an eyeglass, may include a first earpiece frame 110a and a second earpiece frame 110b. The first earpiece frame 110a may be placed on the right ear of a user wearing the eyepiece frame 100. The first earpiece frame 110a may have a bar-shaped structure in which its width and angle vary according to the length thereof to be placed on the ear, and may be coupled to a first main body 130a through a first hinge 120a described later. Also, the second earpiece frame 110b may have a shape symmetrical to that of the first earpiece frame 110a, and may be placed on the left ear of a user wearing the eyepiece. The second earpiece frame 110b may be coupled to a second main body 130b through a second hinge 120b.

The hinge 120 may include the first hinge 120a and the second hinge 120b that are symmetrical about the main body 130. In FIG. 1, the first hinge 120a may be formed to pivot the first earpiece frame 110a about the first main body 130a by 360 degrees.

The second hinge 120b may be formed to the second earpiece frame 110b about the second main body 130b by 360 degrees.

The main body 130 may include the first main body 130a and the second main body 130b that are connected by the main body bridge 140. The first main body 130a may be connected to the first earpiece frame 110a through the first hinge 120a, and may serve as a pivot when the first earpiece frame 110a pivots on the first hinge 120a. The first main body 130a may include a rim in which a lens corresponding to the right eye of a user wearing the eyeglass frame 100 is secured.

The second main body 130b may be connected to the second earpiece frame 110b through the second hinge 120b, and may serve as a pivot when the second earpiece frame 110b pivots on the second hinge 120b. The second main body 130a may include a rim in which a lens corresponding to the left eye of a user wearing the eyeglass frame 100 is secured.

The main body bridge 140 may be formed over the support frame 150 to connect the first main body 130a and the second main body 130b in the horizontal direction. The inner circumference of the main body bridge 140 may be a closed curve, for example, a trapezoidal shape in which the upper side is shorter than the lower side but each side thereof is curved with a certain curvature, not straight.

The support frame 150 may extend from the center of each outer circumference of the first main body 130a and the second main body 130b, and may be spaced from the first main body 130a and the second main body 130b by a predetermined interval except a point where the support frame starts to extend. The support frame 150 may be disposed spaced from the first main body 130a and the second main body 130b along the outer circumferences of the first main body 130a and the second main body 130b. Here, the predetermined interval may be configured to range from about 0.5 mm to about 1 mm.

The extension member 160 may extend from the center of the lower end of the support frame 150 to connect the nose pad 170 disposed thereunder to the support frame 150. Here, the extension member 160 may have a vertical length of about 1 mm to about 2 mm.

The nose pad 170 may be connected to the lower end of the extension member, and may have a parabolic shape in which the start point and the end point of the nose pad 170 may be downwardly located at both sides of the extension member 160, respectively. Here, the curvature of a portion of the nose pad 170 supported by the nose may be greater than that of the outer circumference at the lowermost portion of the main body bridge 140.

The nose pad 170 is configured such that the orientation thereof can be adjusted forward or backward about the extension member 160, and the width of the parabolic shape thereof can be easily adjusted in order to adjust the nose height.

The eyeglass frame 100 of this embodiment also has a structural feature in that the first main body 130a and the second main body 130b, which constitute the main body 130, are more planar about the main body bridge 140 than typical eyeglasses such that they more closely abut the face.

Figure 3:
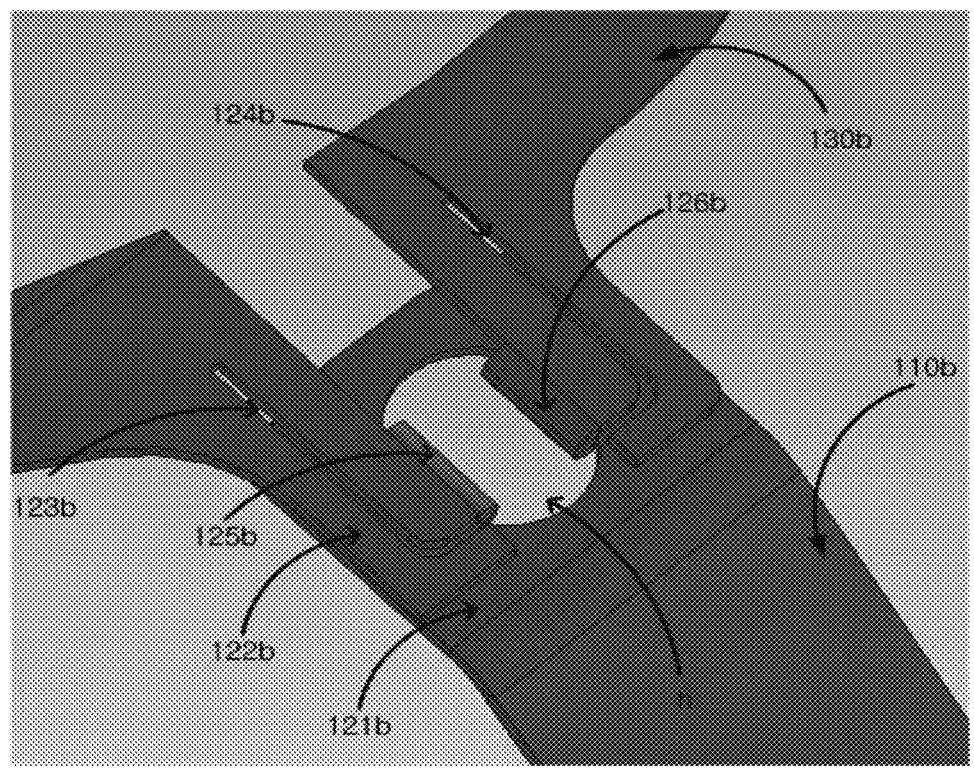
FIGS. 3 and 4 are views illustrating a structure of a second hinge in the eyeglass frame of FIG. 1 according to an embodiment.
Figure 4:
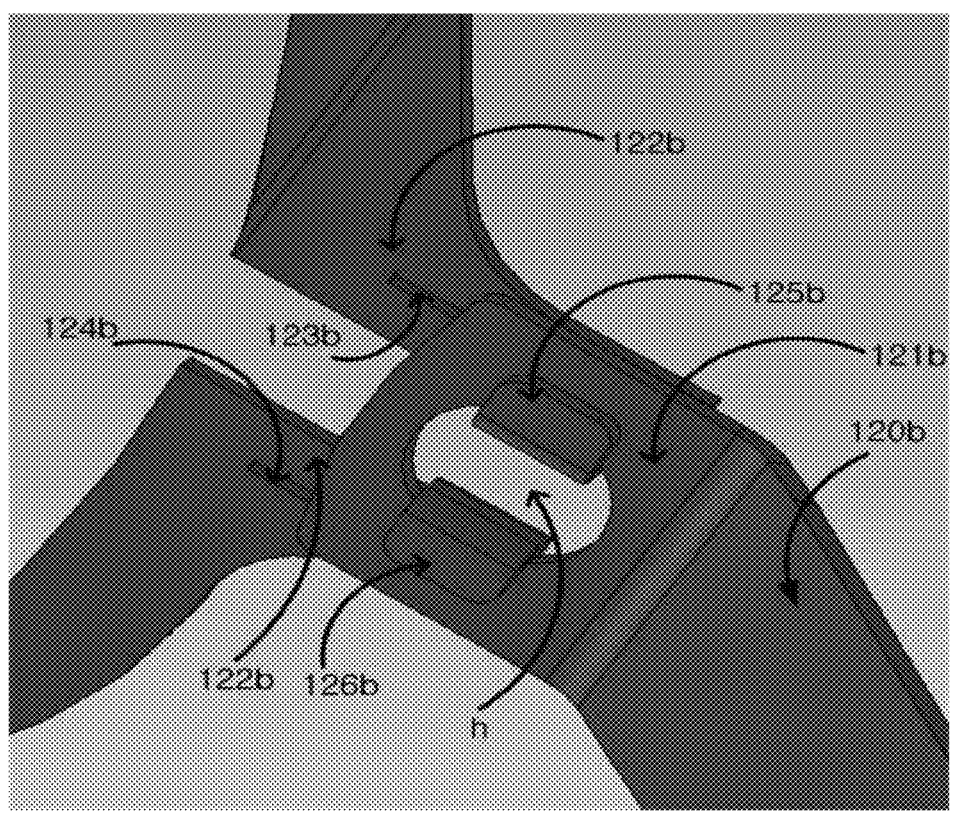

FIGS. 3 and 4 are views illustrating the structure of the second hinge 120b of the hinge 120 in the eyeglass frame 100 of FIG. 1 according to an embodiment. For convenience of explanation, although the description of the embodiment of FIGS. 3 and 4 is made based on the second hinge 120b, it will be understood that the first hinge 120a and the second hinge 120b has a symmetrical structure about the main body 130.

The second hinge 120b may include a first hinge plate 121b, a second hinge plate 122b, a first elastic slit 123b, a second elastic slit 124b, a first rotary member 125b, and a second rotary member 126b.

The first hinge plate may extend from the second earpiece frame 110b, and may have a rotary hole "h" formed at the center thereof.

The second hinge plate 122b may extend from the second main body 130b, and may have a rotary hole "h" formed at the center thereof similarly to the first hinge plate 121b.

The first elastic slit 123b may be formed by partially cutting the second hinge plate 122b at a point where the first rotary member 125b inserted into the rotary hole "h" of the second hinge plate 122b is disposed. The first elastic slit 123b may prevent the point where the first rotary member 125b is disposed from being damaged by an external force during the rotation of the first rotary member 125b. When the eyeglass frame 100 is placed on a horizontal plane, the first rotary member 125b may be inserted into the lower end portion of the rotary hole "h" of the second hinge plate 122b to allow the first hinge plate 121b to adhere closely to the second hinge plate 122b.

The second elastic slit 124b may be formed by partially cutting the second hinge plate 122b at a point where the second rotary member 126b inserted into the rotary hole "h" of the second hinge plate 122b is disposed. The second elastic slit 124b may prevent the point where the second rotary member 126b is disposed from being damaged by an external force during the rotation of the second rotary member 126b. When the eyeglass frame 100 is placed on a horizontal plane, the second rotary member 126b may be inserted into the upper end portion of the rotary hole "h" of the second hinge plate 122b to allow the first hinge plate 121b to adhere closely to the second hinge plate 122b.

Figure 5:
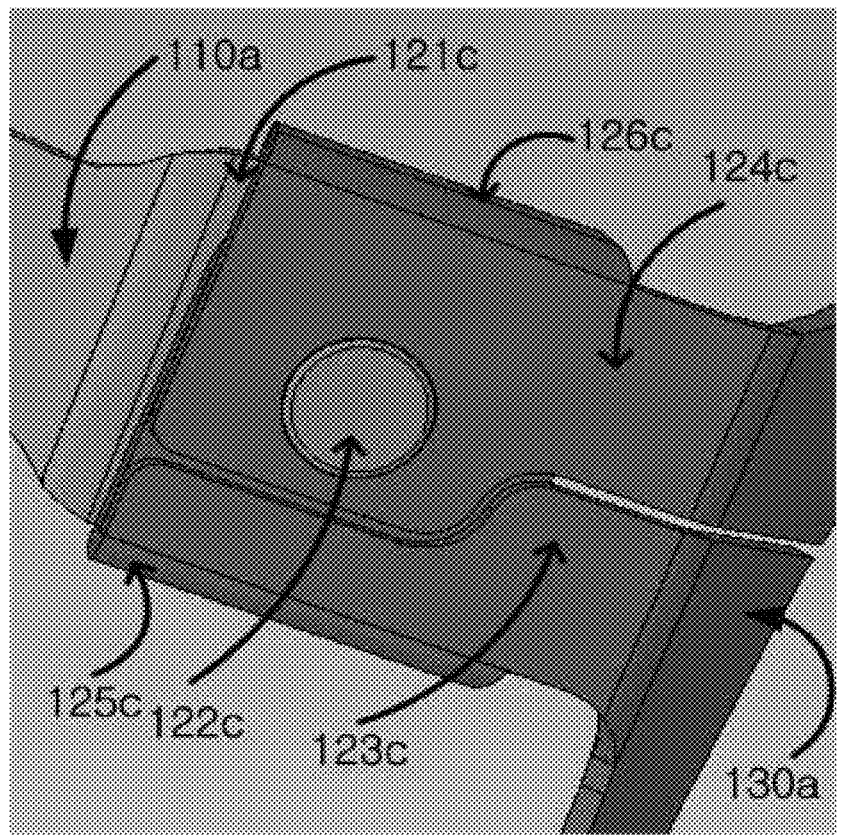
FIGS. 5 and 6 are views illustrating a first hinge in the eyeglass frame of FIG. 1 according to another embodiment.
Figure 6:
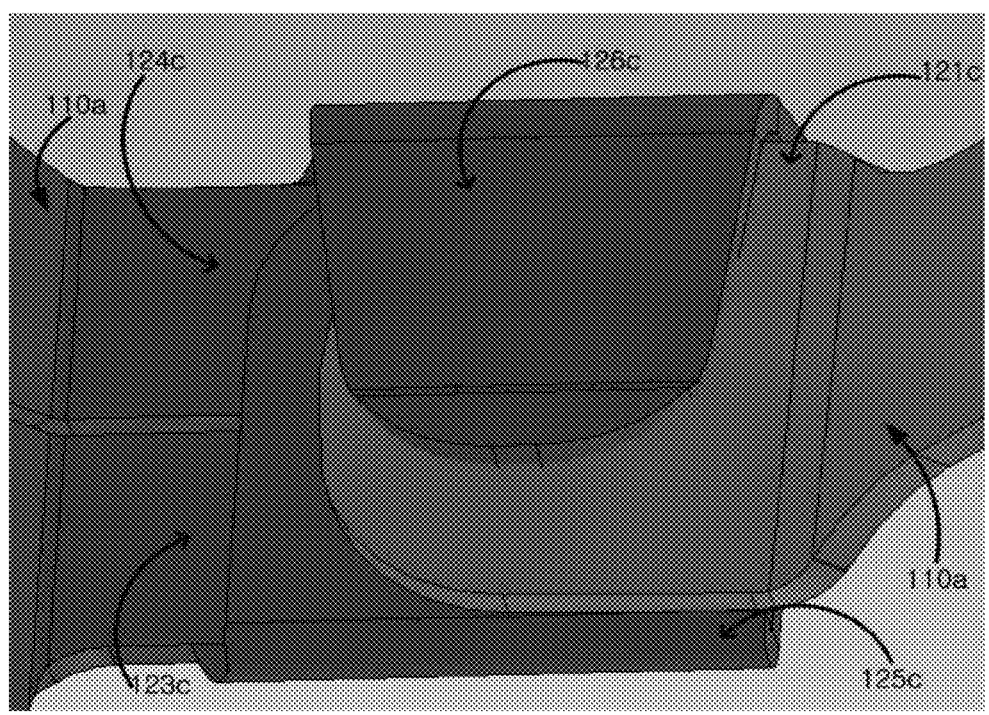

FIGS. 5 and 6 are views illustrating the structure of a first hinge 120c of the hinge 120 in the eyeglass frame 100 of FIG. 1 according to another embodiment. For convenience of explanation, although the description of the embodiment of FIGS. 5 and 6 is made based on the first hinge 120c that is modified from the first hinge 120a of FIG. 1, it will be understood that the first hinge 120a of FIG. 1 can be modified into a symmetrical structure about the main body 130.

The first hinge 120c may allow the first earpiece frame 110a to rotate about the first main body 130a in the clockwise direction by about 180 degree due to an external force.

Referring to FIGS. 1 through 6, the first hinge 120c may include a first hinge plate 121c, a rotary body 122c, a second hinge plate 123c, a third hinge plate 124c, a first extension plate 125c, and a second extension plate 126c.

The first hinge plate 121c may extend from a first earpiece frame 110a, and may receive the rotary body 122c formed in the center thereof. The rotary body 122c may penetrate the third hinge plate 124c.

The second hinge plate 123c may extend from a lower portion of a first main body 130a on a vertical plane, and may be connected to the first extension plate 125c that is inwardly folded.

The third hinge plate 124c and the second hinge plate 123c may be disposed spaced from each other on a vertical plane. The third hinge plate 124c may extend from the upper end portion of the main body 130b, and may be connected to the second extension plate 126c that is inwardly folded.

The first hinge plate 121c and the second extension plate 126c may be sequentially stacked on the rear surface of the first extension plate 125c. The center of the first extension plate 125c may be penetrated by the rotary body 122c disposed in the first hinge plate 121c. The rotary body 122c may penetrate the third hinge plate 124c.

Figure 7:
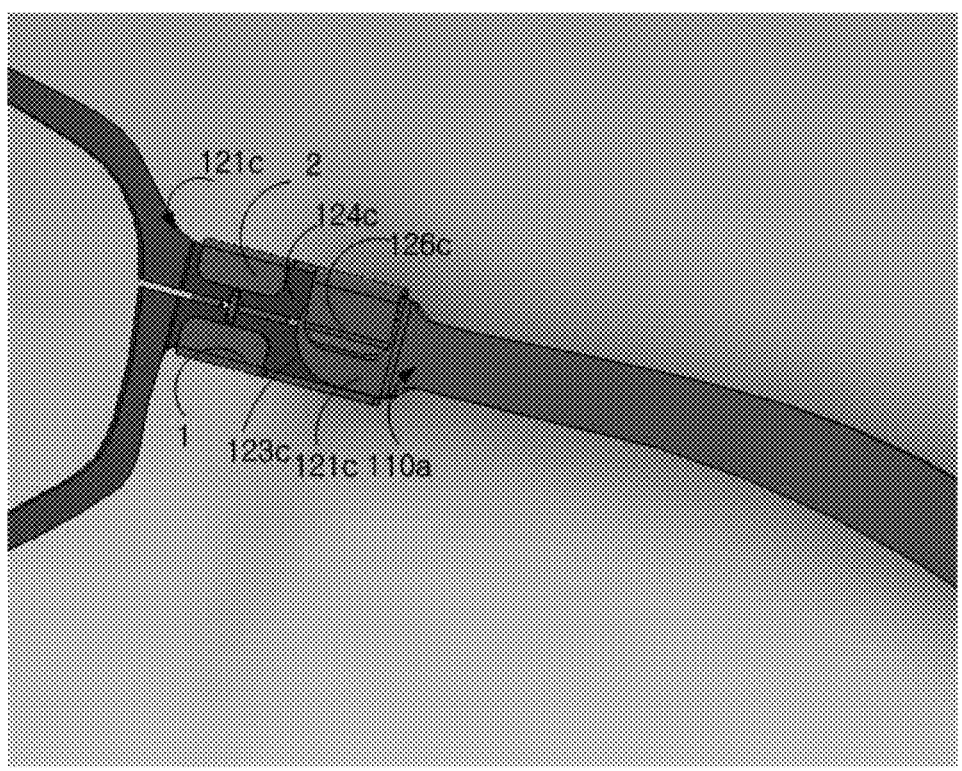
FIG. 7 is a view illustrating a first hinge in the eyeglass frame of FIG. 1 according to another embodiment.

FIG. 7 is a view illustrating a first hinge 120c of a hinge 120 in the eyeglass frame 100 of FIG. 1 according to another embodiment. For convenience of explanation, although the description of the embodiment of FIG. 7 is made based on the first hinge 120c that is modified from the first hinge 120a of FIG. 1, it will be understood that the first hinge 120a of FIG. 1 can be modified into a symmetrical structure about the main body 130. On the other hand, the first hinge 120c of FIG. 7 may be basically similar to the first hinge 120c, but may include additional components.

Specifically, the first hinge 120c may include a first auxiliary plate 1 and a second auxiliary plate 2. The first auxiliary plate 1 may be inwardly folded toward a second hinge plate 123c that extends in the longitudinal direction compared to that of FIGS. 5 and 6.

Also, the second auxiliary plate 2 may be inwardly folded toward a third hinge plate 124c that extends in the longitudinal direction compared to that of FIGS. 5 and 6.

Figure 8:
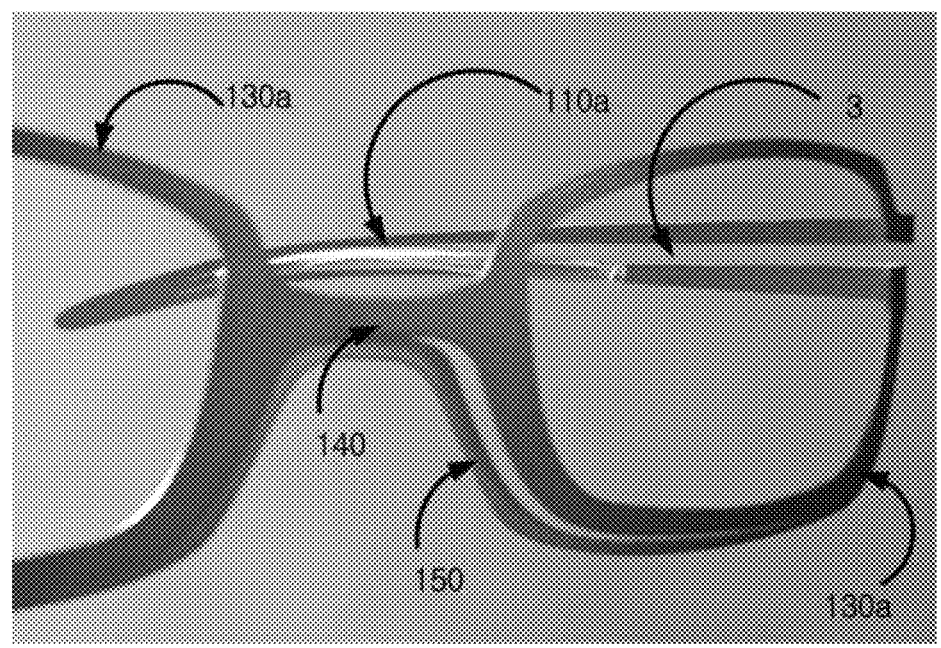
FIG. 8 is a view illustrating a structure of an eyeglass frame according to another embodiment.

FIG. 8 is a view illustrating the structure of an eyeglass frame according to another embodiment. Referring to FIGS. 1 through 8, a first earpiece frame 110a of FIG. 8 may be basically similar to the first earpiece frame 110a of FIG. 1, but may have an elastic slit 3. The elastic slit 3 may extend from the first hinge 120 to a certain location of the first earpiece frame 110a. A second earpiece frame 110b may be formed to have a symmetrical shape to that of the first earpiece frame 110a.

Figure 9:
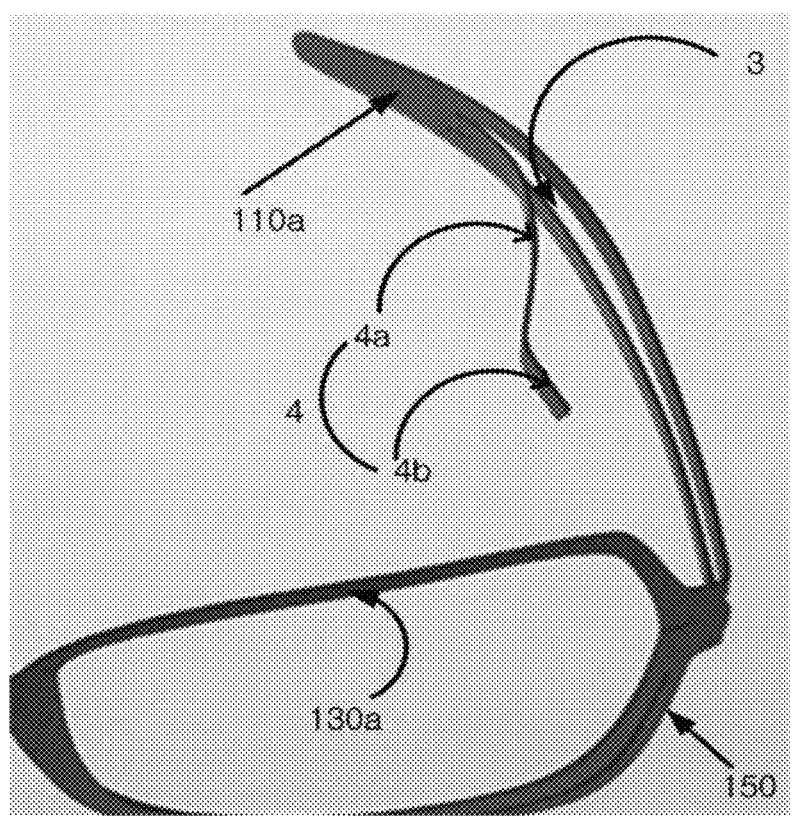
FIG. 9 is a view illustrating a structure of an eyeglass frame according to still another embodiment.

FIG. 9 is a view illustrating a structure of an eyeglass frame according to still another embodiment. Referring to FIGS. 1 through 8, a first earpiece frame 110a of FIG. 9 may further include a pressure part 4 compared to the first earpiece frame 110a of FIG. 8. The pressure part 4 may include an extension member 4a and a pressure member 4b. The extension member 4a may extend from the end portion where an elastic slit 3 of the first earpiece frame 110a starts, and may have an angle of about 29 degrees to about 46 degrees with respect to the first earpiece frame 110a. The pressure member 4b may be parallel to the first earpiece frame 110a, and may extend from the end of the extension member 4a. On the other hand, a second earpiece frame 110b may be formed to have a symmetrical shape to that of the first earpiece frame 110a.

Figure 10:
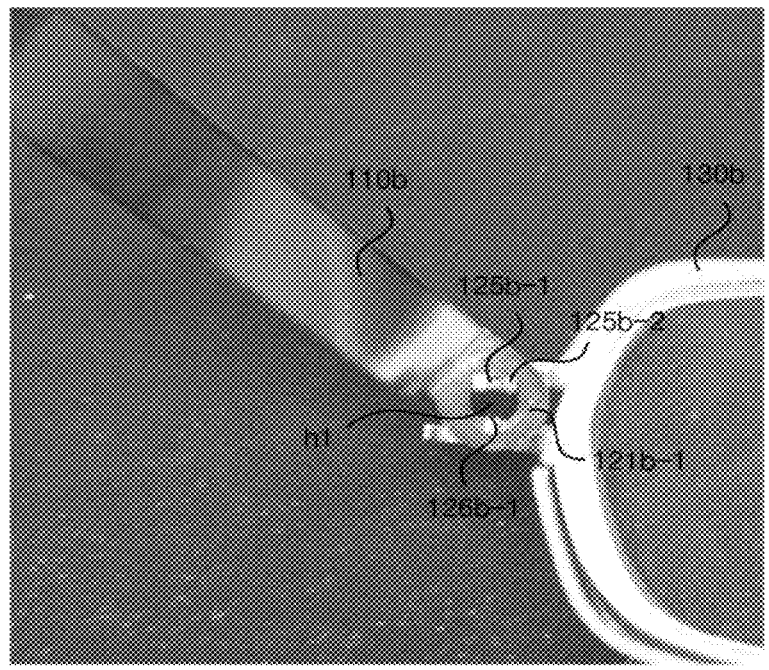
FIG. 10 to FIG. 12 are views illustrating a structure of a second hinge according to another embodiment.
Figure 11:
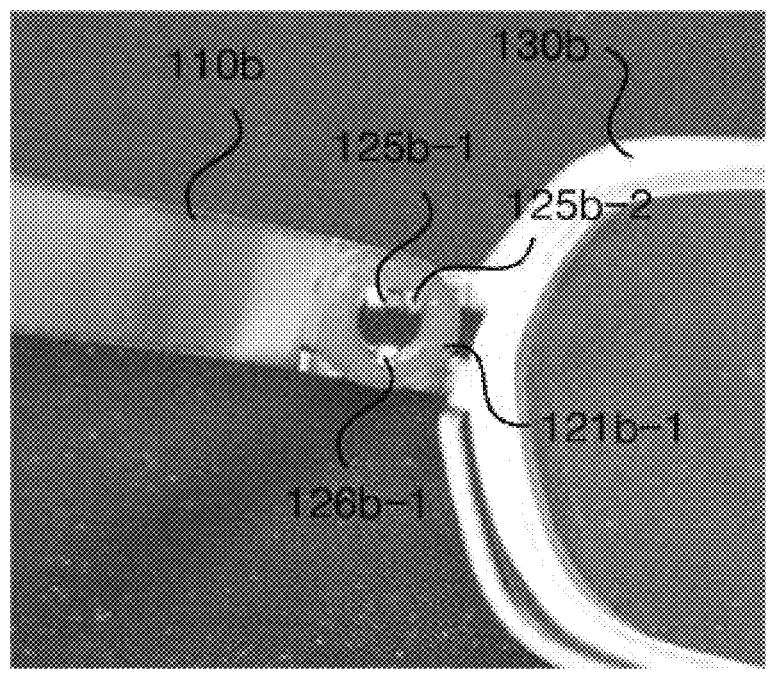
Figure 12:
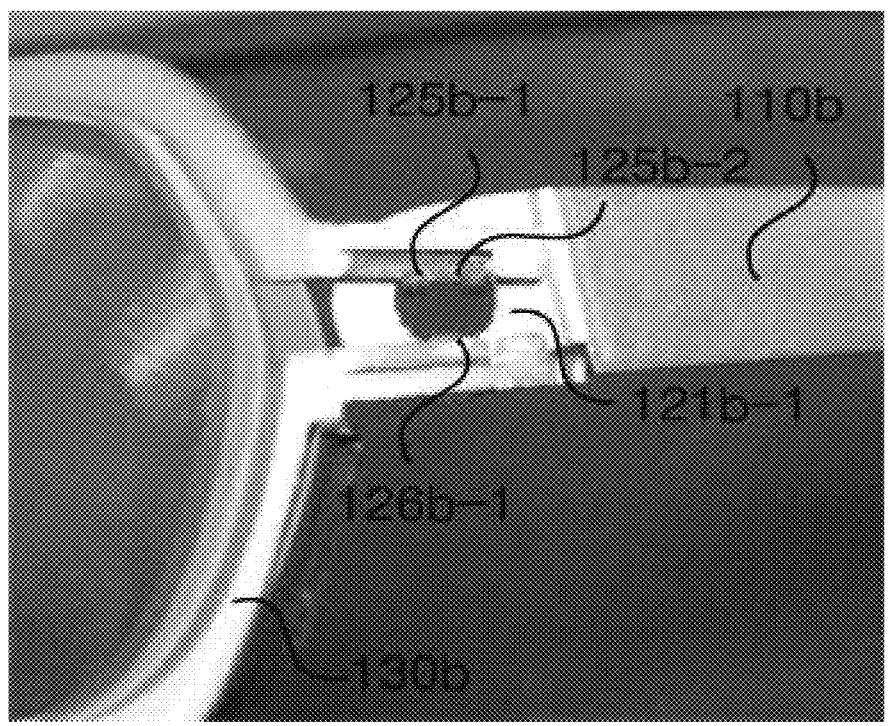

FIG. 10 to FIG. 12 are views illustrating a structure of a second hinge 120b-1 according to another embodiment of the invention. Although not shown in the figures, a first hinge (not shown) is provided at a position that is opposite the second hinge 120b-1 about the main body bridge 140, and has the same configuration.

A first-of-first hinge plate 121b-1 is configured such that it extends from the second earpiece frame 110b, has a rotary hole "h1" formed at the central portion thereof, and has the shape of a circular rim. A first-of-first rotary member 125b-1 is formed in the upper portion of the inner circumference of the first-of-first hinge plate 121b-1, spaced apart from a second-of-first hinge plate 125b-2. A first-of-second rotary member 126b-1 is formed in the lower portion of the inner circumference of the first-of-first hinge plate 121b-1, in contrast to the first-of-first rotary member 125b-1 and the second-of-first rotary member 125b-2.

Owing to these structures of the first-of-first rotary member 125b-1, the second-of-first rotary member 125b-2, and the first-of-second rotary member 126b-1, there are effects in that rotation becomes smooth since friction that occurs during rotation of the second earpiece frame 110b decreases and in that the structure of the eyeglass frame is firmly maintained before and after the rotation.

Figure 13A:
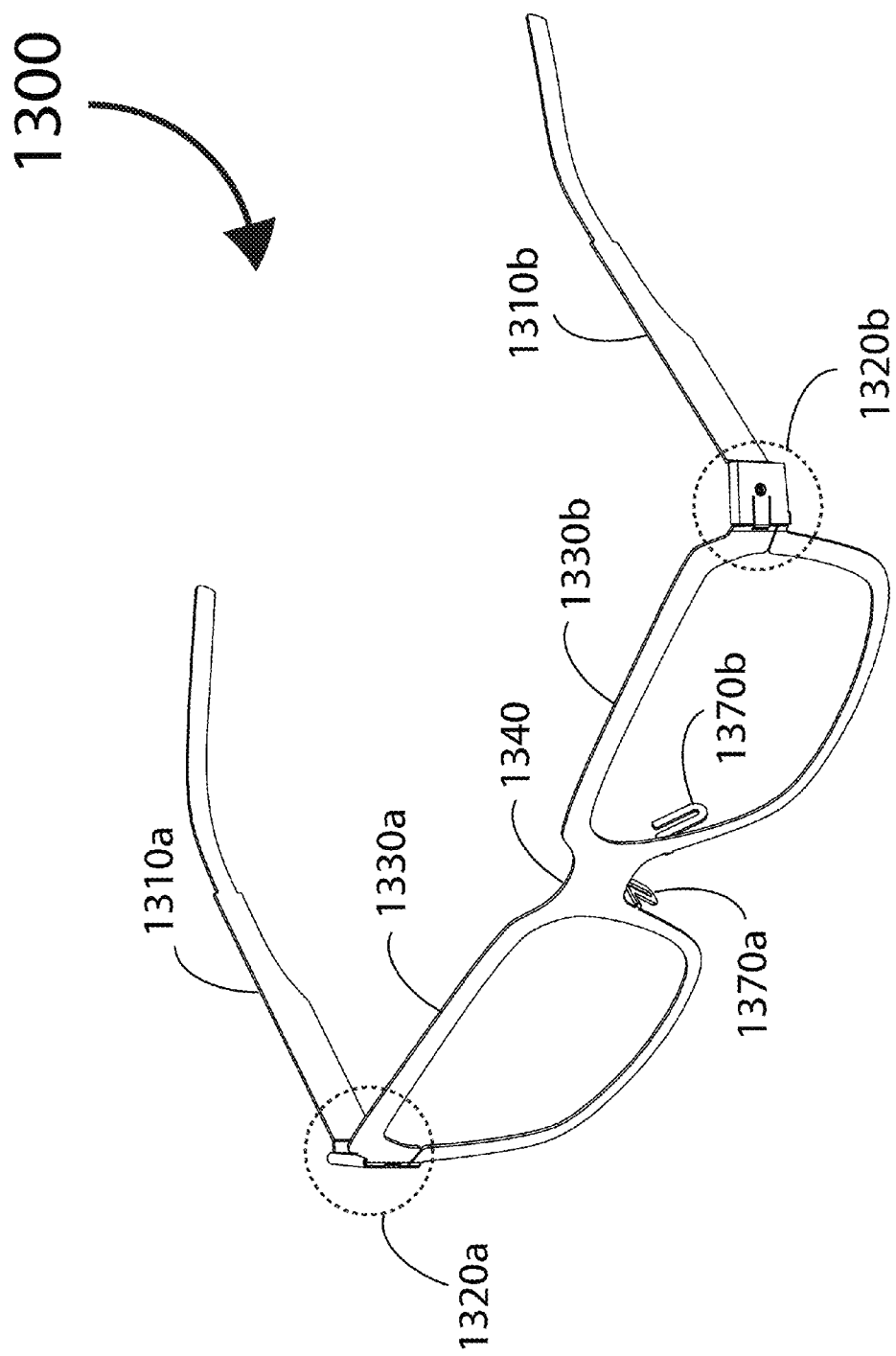
FIG. 13A is a perspective view of yet another embodiment of an eyeglasses with the earpiece frames folded out.
Figure 13B:
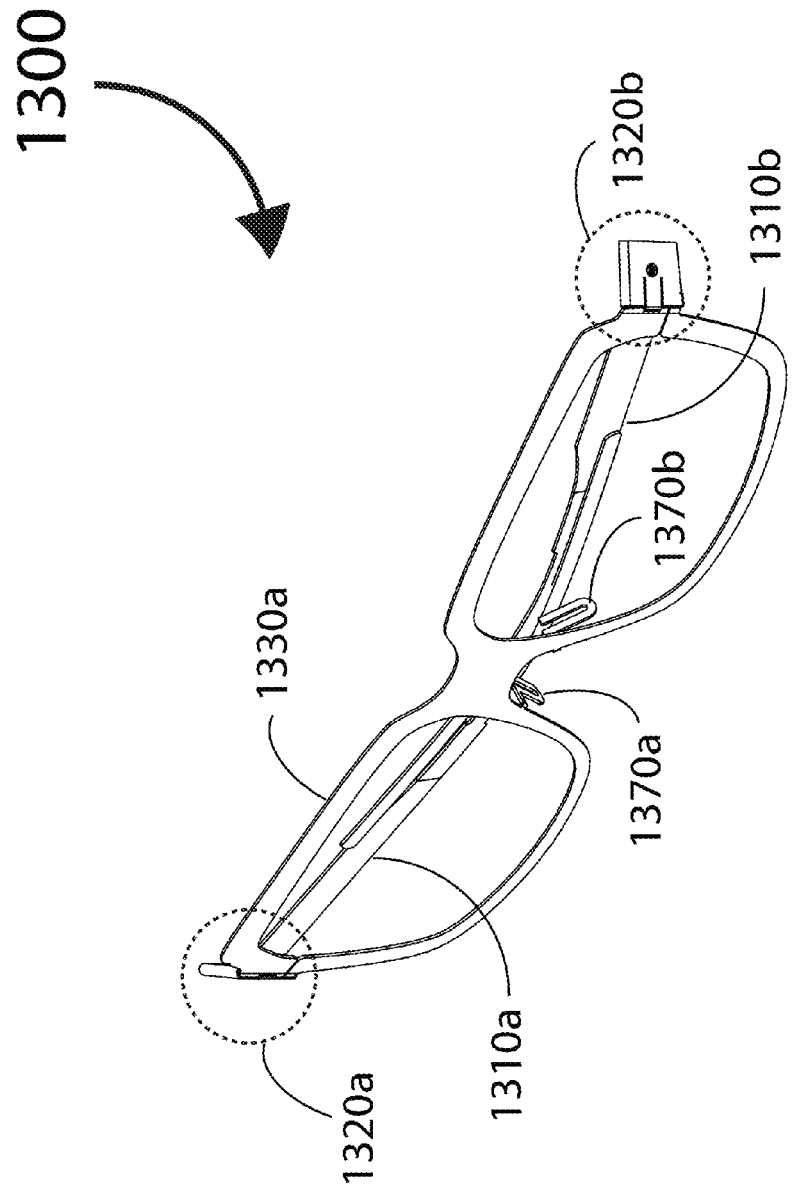
Figure 13C:
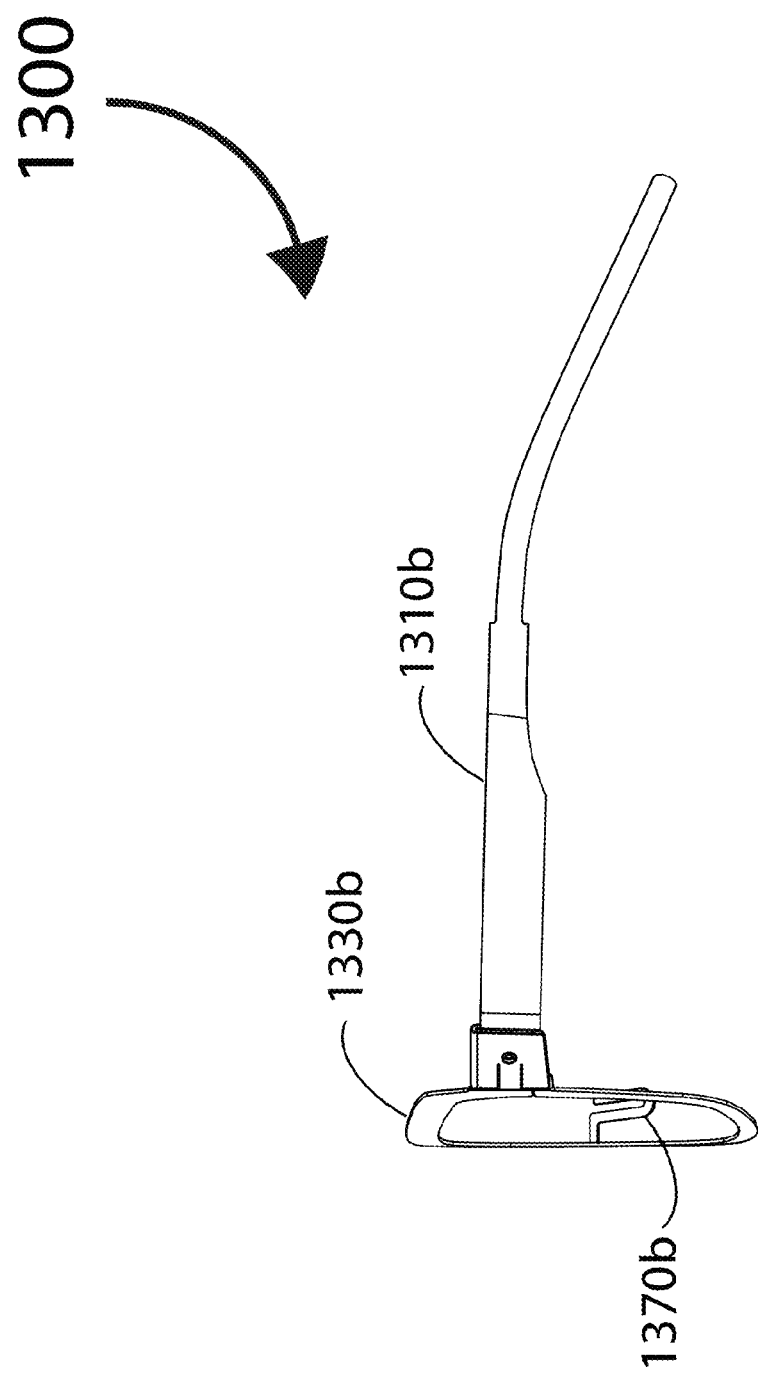
FIG. 13C is a side view of the eyeglasses of FIG. 13A, with the earpiece frames folded out.
Figure 13E:
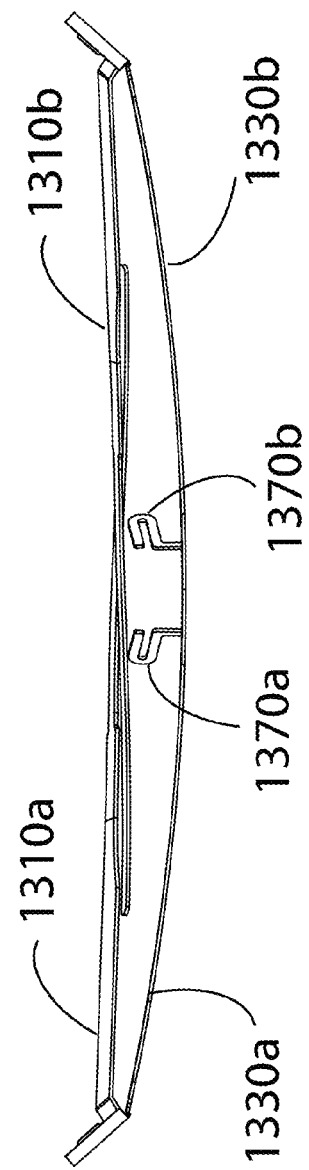
Figure 13F:
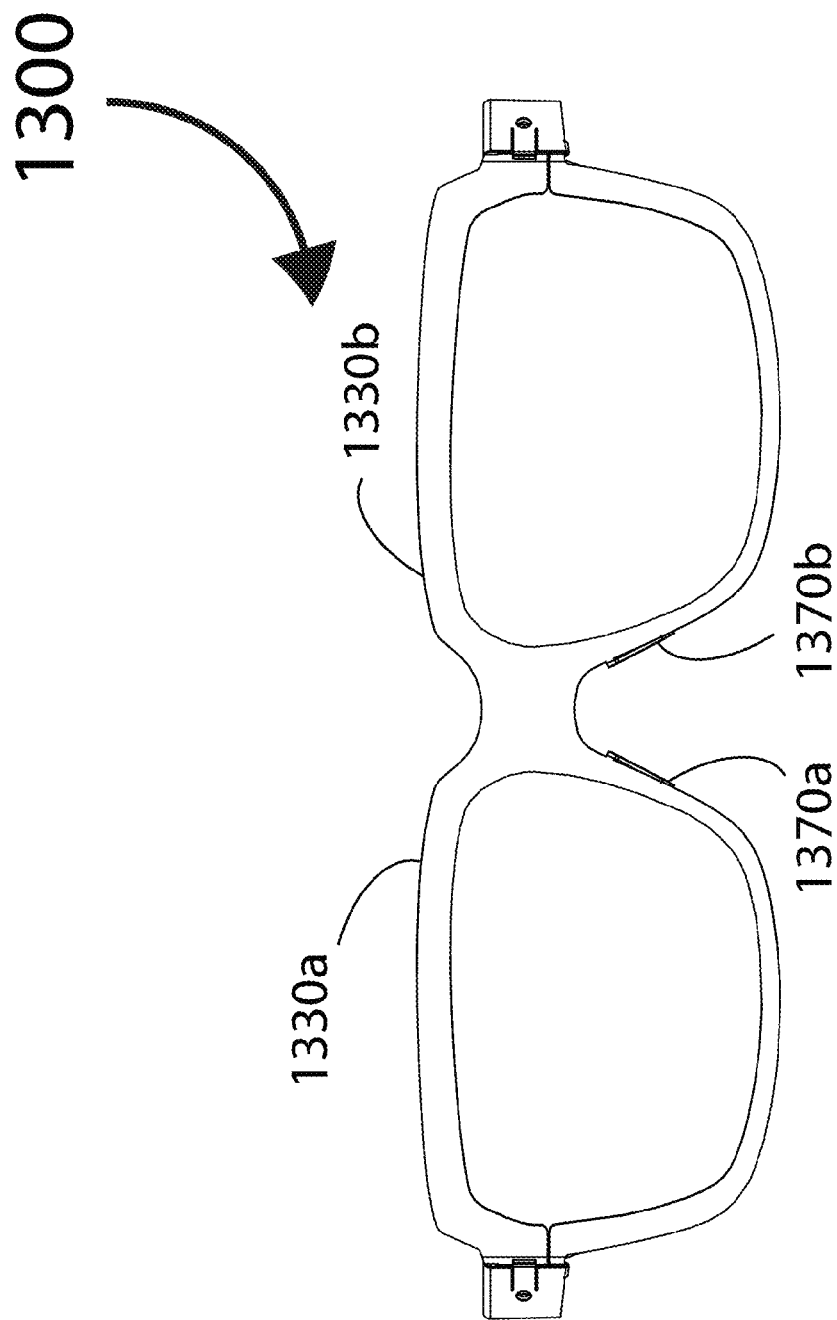
FIG. 13F is a front view of the eyeglasses of FIG. 13A, with the earpiece frames folded out.

FIG. 13A is a perspective view of another embodiment of an eyeglasses 1300 with the earpiece frames folded out. FIG. 13B is a second perspective view of eyeglasses 1300 with the earpiece frames 1310a, 1310b folded in. FIG. 13C is a side view of eyeglasses 1300 with the earpiece frames 1310a, 1310b folded out. FIG. 13D is a top view of eyeglasses 1300 with the earpiece frames 1310a, 1310b folded out, while FIG. 13E is another top view of eyeglasses 1300 with the earpiece frames 1310a, 1310b folded in. In addition, FIG. 13F is a front view of eyeglasses of 1300 with the earpiece frames folded out. In this embodiment, eyeglasses 1300 may include earpiece frame 1310, hinge 1320, a main body 1330, a main body bridge 1340 and nose pad 1370.

The earpiece frame 1310, which are temples of eyeglass 1300, may include a first earpiece frame 1310a and a second earpiece frame 1310b. The first earpiece frame 1310a may be placed on the right ear of a user wearing eyeglasses 1300. The first earpiece frame 1310a may have a bar-shaped structure in which its width and angle vary according to the length thereof to be placed on the ear, and may be coupled to a first main body 1330a through a first hinge 1320a described later. Also, the second earpiece frame 1310b may have a shape symmetrical to that of the first earpiece frame 1310a, and may be placed on the left ear of a user wearing the eyepiece. The second earpiece frame 1310b may be coupled to a second main body 130b through a second hinge 1320b.

The hinge 1320 may include the first hinge 1320a and the second hinge 1320b that are symmetrical about the main body 1330. The first hinge 1320a may be formed to pivot the first earpiece frame 110a about the first main body 1330a by 360 degrees. The second hinge 1320b may be formed to the second earpiece frame 1310b about the second main body 1330b by approximately 360 degrees.

The main body 1330 may include the first main body 1330a and the second main body 1330b that are connected by the main body bridge 1340. The first main body 1330a may be connected to the first earpiece frame 1310a through the first hinge 1320a, and may serve as a pivot when the first earpiece frame 1310a pivots on the first hinge 1320a. The first main body 1330a may include a rim in which a lens corresponding to the right eye of a user wearing the eyeglasses 1300 is secured.

The second main body 1330b may be connected to the second earpiece frame 1310b through the second hinge 1320b, and may serve as a pivot when the second earpiece frame 1310b pivots on the second hinge 1320b. The second main body 1330a may include a rim in which a lens corresponding to the left eye of a user wearing the eyeglasses 1300 is secured.

The main body bridge 1340 may be formed to connect the first main body 1330a and the second main body 1330b in the horizontal direction. The inner circumference of the main body bridge 1340 may be a closed curve, for example, a trapezoidal shape in which the upper side is shorter than the lower side but each side thereof is curved with a certain curvature, not straight.

The nose pad 1370 may be connected to the lower end of the bridge 1340 and may have a parabolic shape in which the start point and the end point of the nose pad 1370 may be downwardly located at both sides of the extension member 1360, respectively. Here, the curvature of a portion of the nose pad 1370 supported by the nose may be greater than that of the outer circumference at the lowermost portion of the main body bridge 1340.

The eyeglasses 1300 of this embodiment also has a structural feature in that the first main body 1330a and the second main body 1330b, which constitute the main body 1330, are more planar about the main body bridge 1340 than typical eyeglasses such that they more closely abut the user's face.

Figure 14:
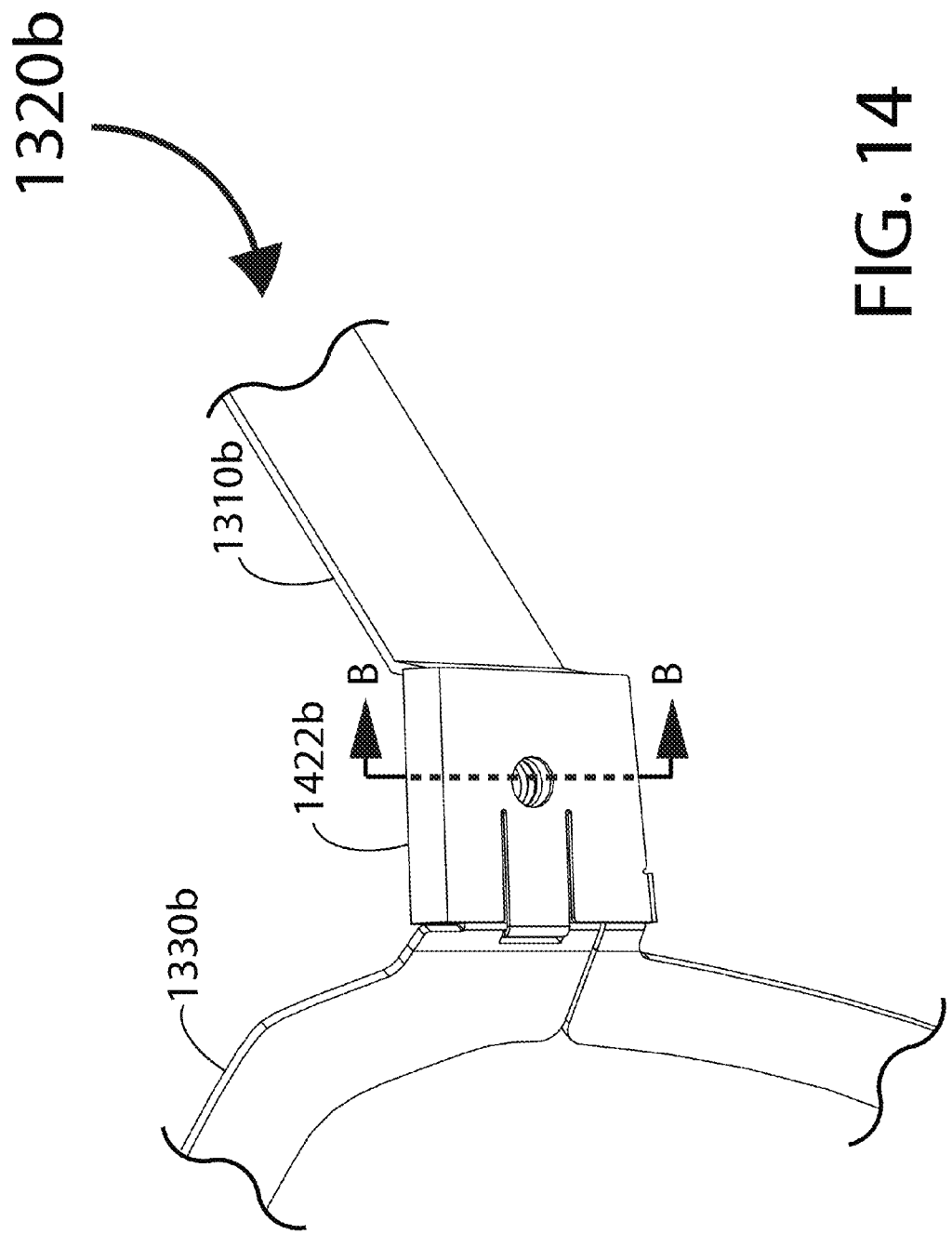
FIG. 14 is a close-up view of the left hinge of the eyeglasses of FIG. 13A.
Figure 15:
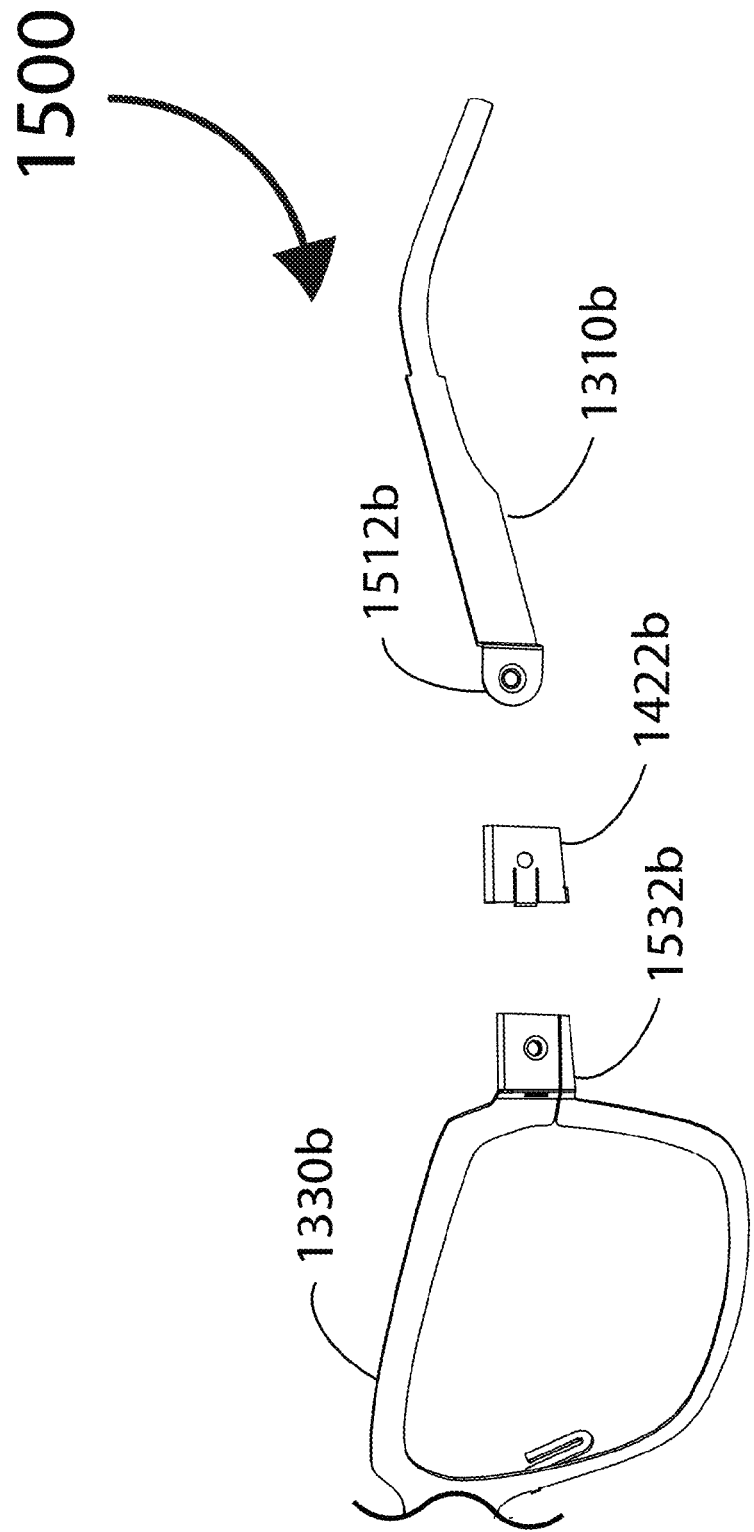
FIG. 15 is a blown up view illustrating the left hinge components of the eyeglasses of FIG. 13A.
Figure 16A:
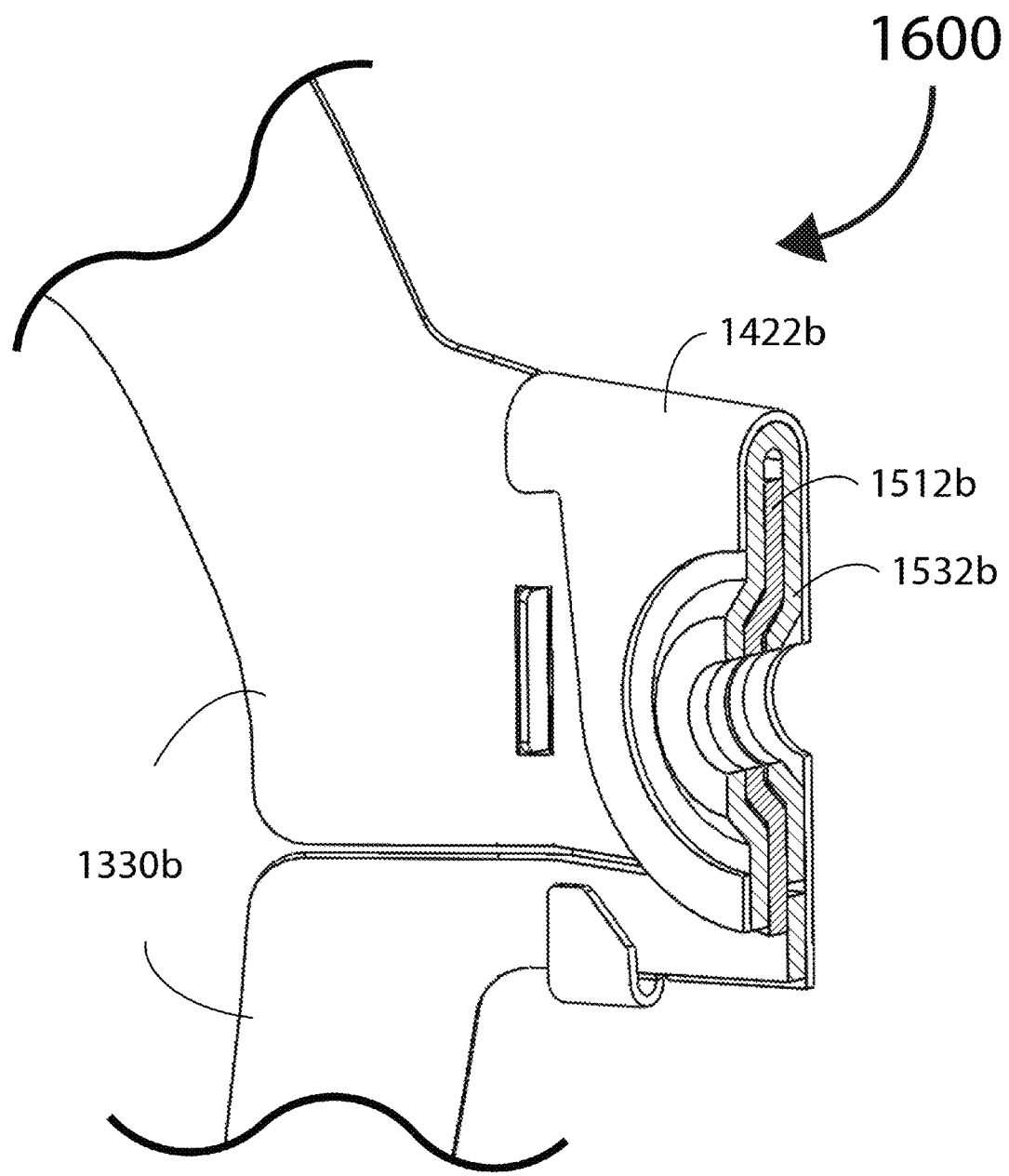
FIGS. 16A and 16B are cross-sectional views illustrating the left hinge components of the eyeglasses of FIG. 13A.
Figure 16B:
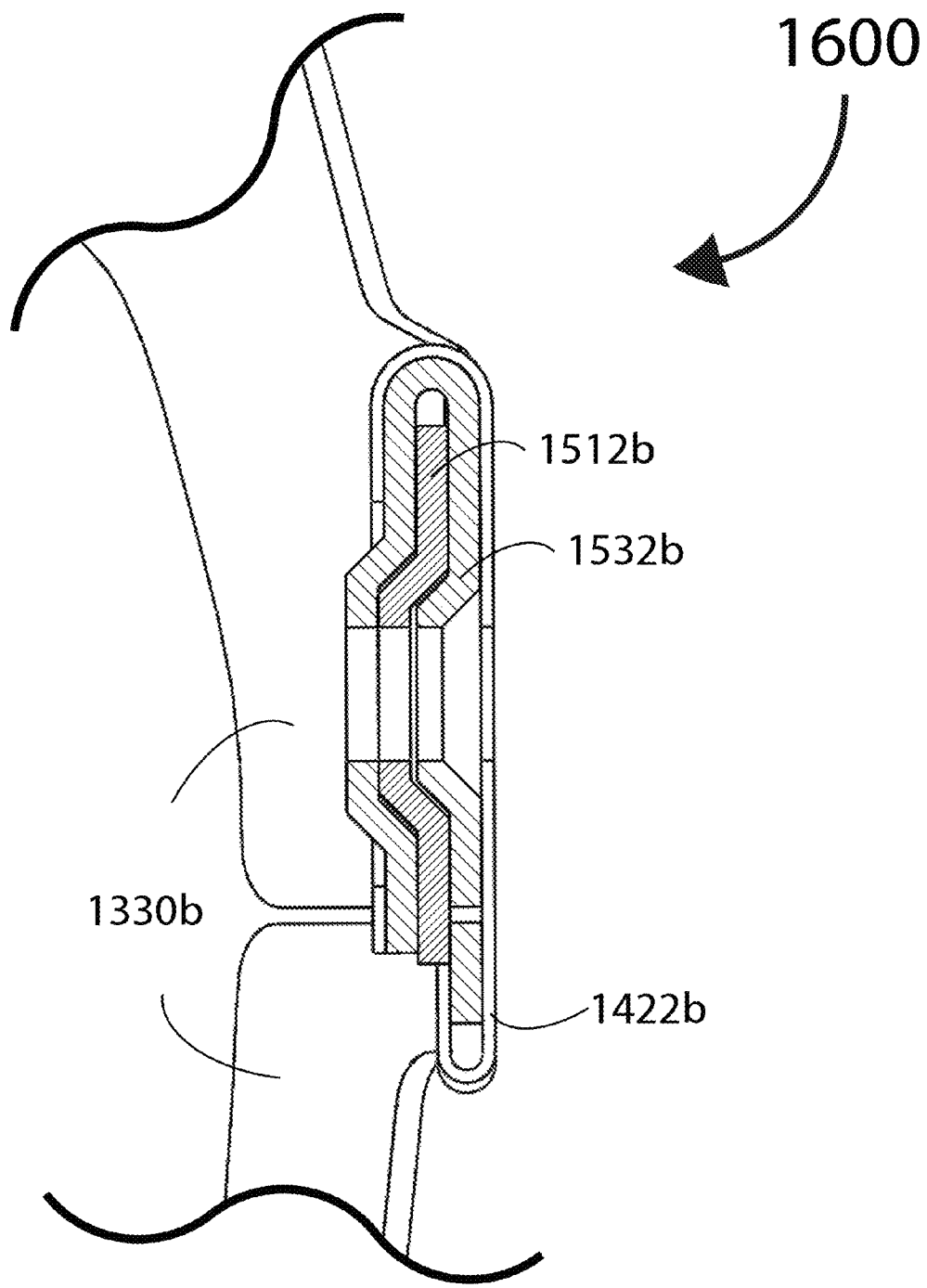

FIG. 14 is a close-up view of the left hinge 1320b of the eyeglass frame 1300, while FIG. 15 is a blown up view illustrating the left hinge 1320b, including frame body 1330b, hinge components 1532b, 1422b, 1512b and temple arm 1310b. FIG. 16A is a cross-sectional view illustrating the left hinge components of left hinge 1320b. The hinge 1320b is dissected along the "B-B" sectional line as shown in FIG. 14. FIG. 16B is another cross-sectional view illustrating the left hinge of the glasses, also along the same "B-B" sectional line and viewing directly at the cutaway sectional line.

The hinge 1320b may include a first hinge plate 1532b, a rotary body 1422b and a second hinge plate 1512b. The first hinge plate 1532b may extend from main body 1330b on a vertical plane. The second hinge plate 1512b may extend from temple arm 1310b, and may receive the rotary body 1422b formed in the center thereof. The hinge operation of eyeglass frame 1300 is similar to the operation of eyeglass frames described above.

Figure 17:
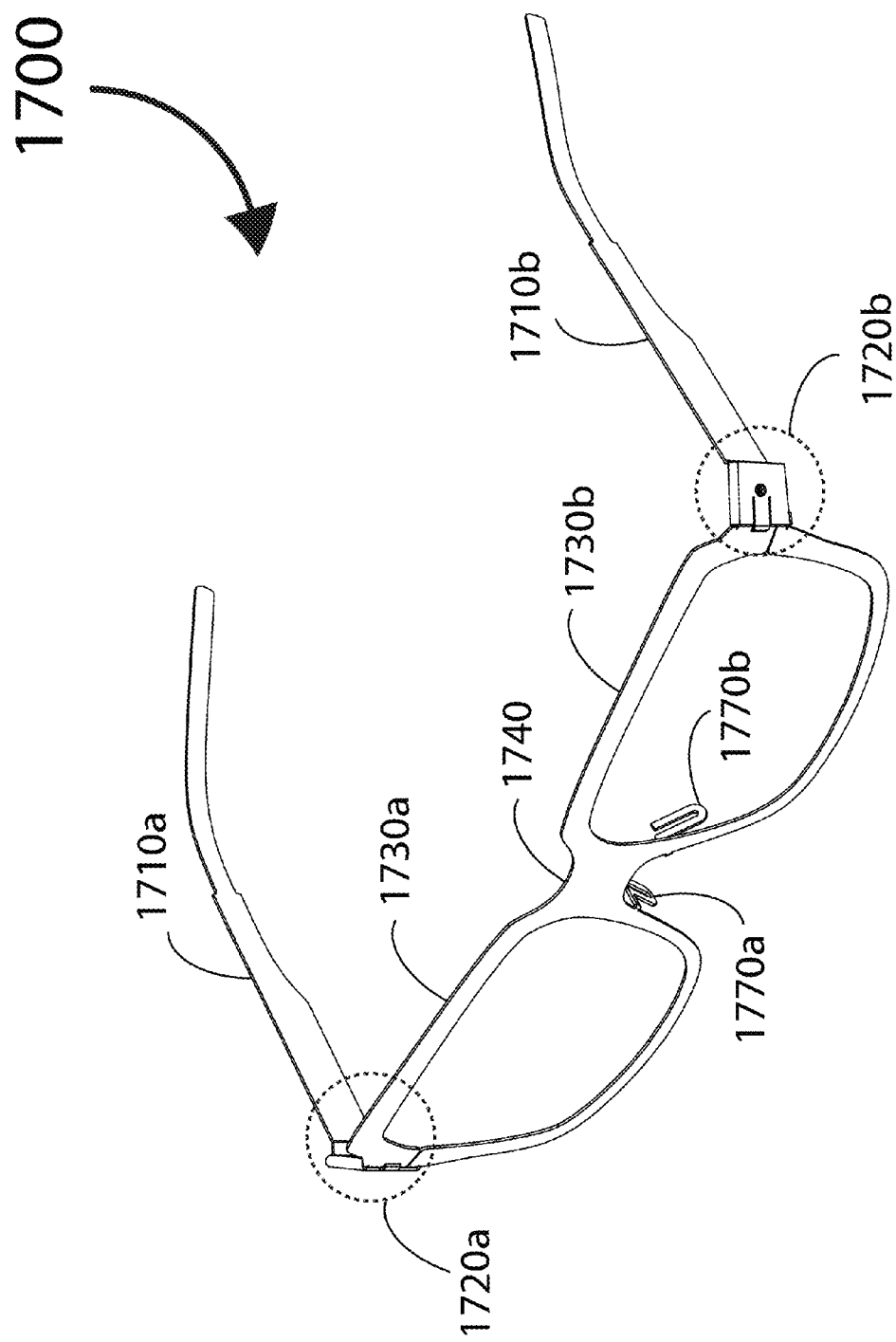
FIG. 17 is a perspective view of another embodiment of an eyeglasses with the earpiece frames folded out.

FIG. 17 is a perspective view of yet another embodiment of an eyeglasses 1700 with the earpiece frames folded out. In this embodiment, eyeglasses 1700 may include earpiece frame 1710, hinge 1720, a main body 1730, a main body bridge 1740 and nose pad 1770.

Earpiece frame 1710, which are temples of eyeglass frame 1700, may include a first earpiece frame 1710a and a second earpiece frame 1710b. Hinge 1720 may include the first hinge 1720a and the second hinge 1720b that are symmetrical about the main body 1730. Main body 1730 may include the first main body 1730a and the second main body 1730b that are connected by the main body bridge 1740. Nose pad 1770 may be connected to the lower end of the bridge 1740.

Figure 18:
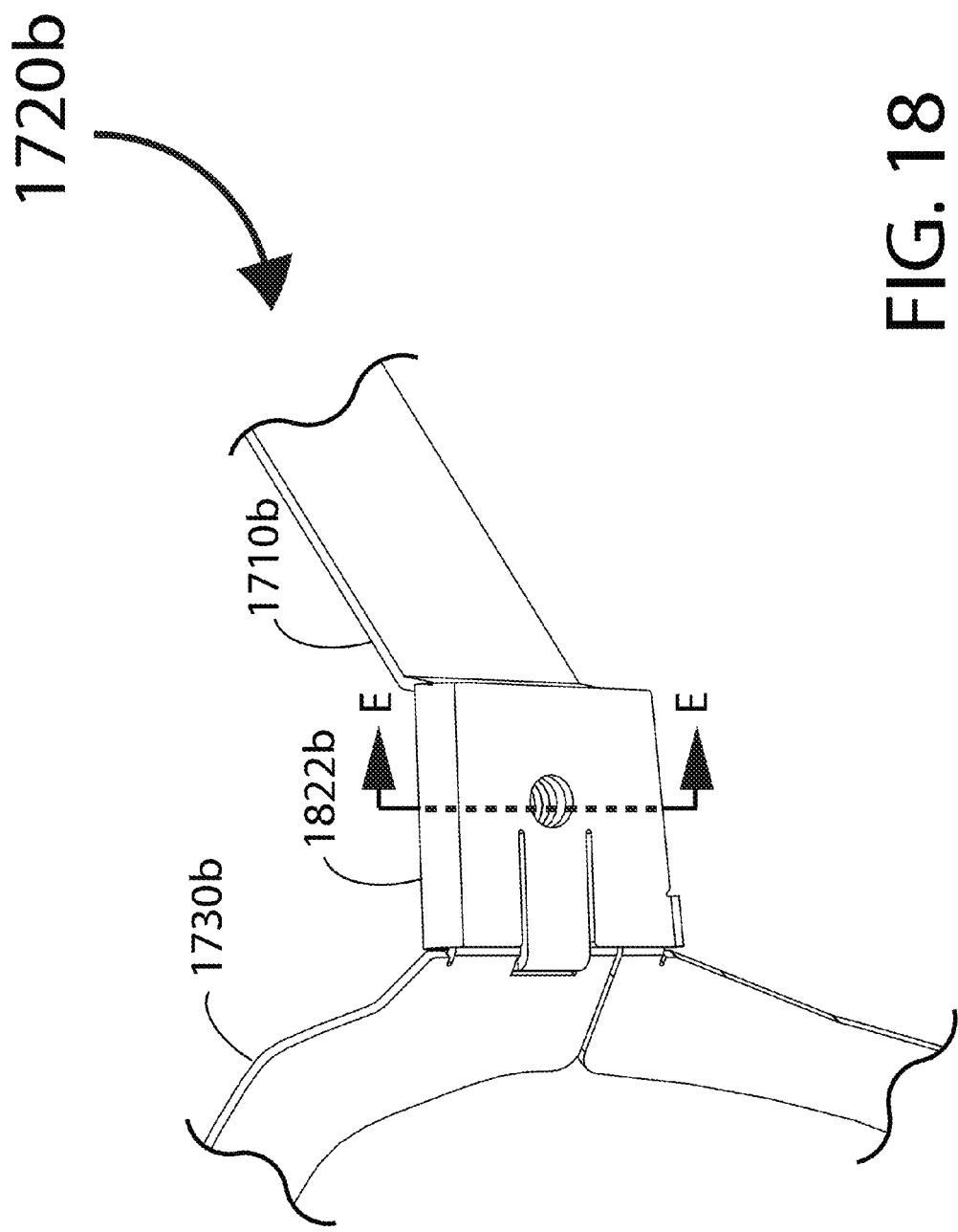
FIG. 18 is a close-up view of the left hinge of the eyeglasses of FIG. 17.
Figure 19:
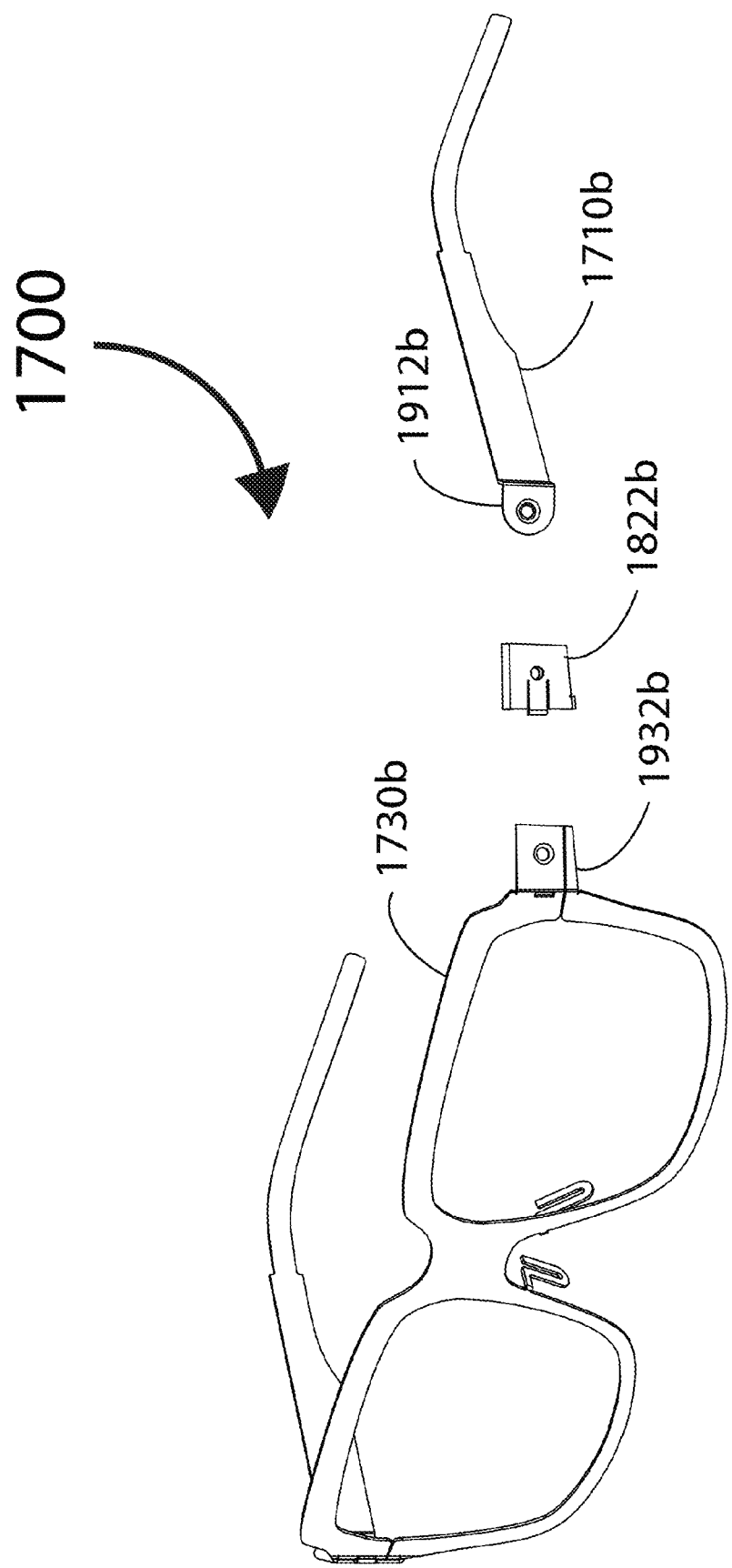
FIG. 19 is a blown up view illustrating the left hinge components of the eyeglasses of FIG. 17.
Figure 20:
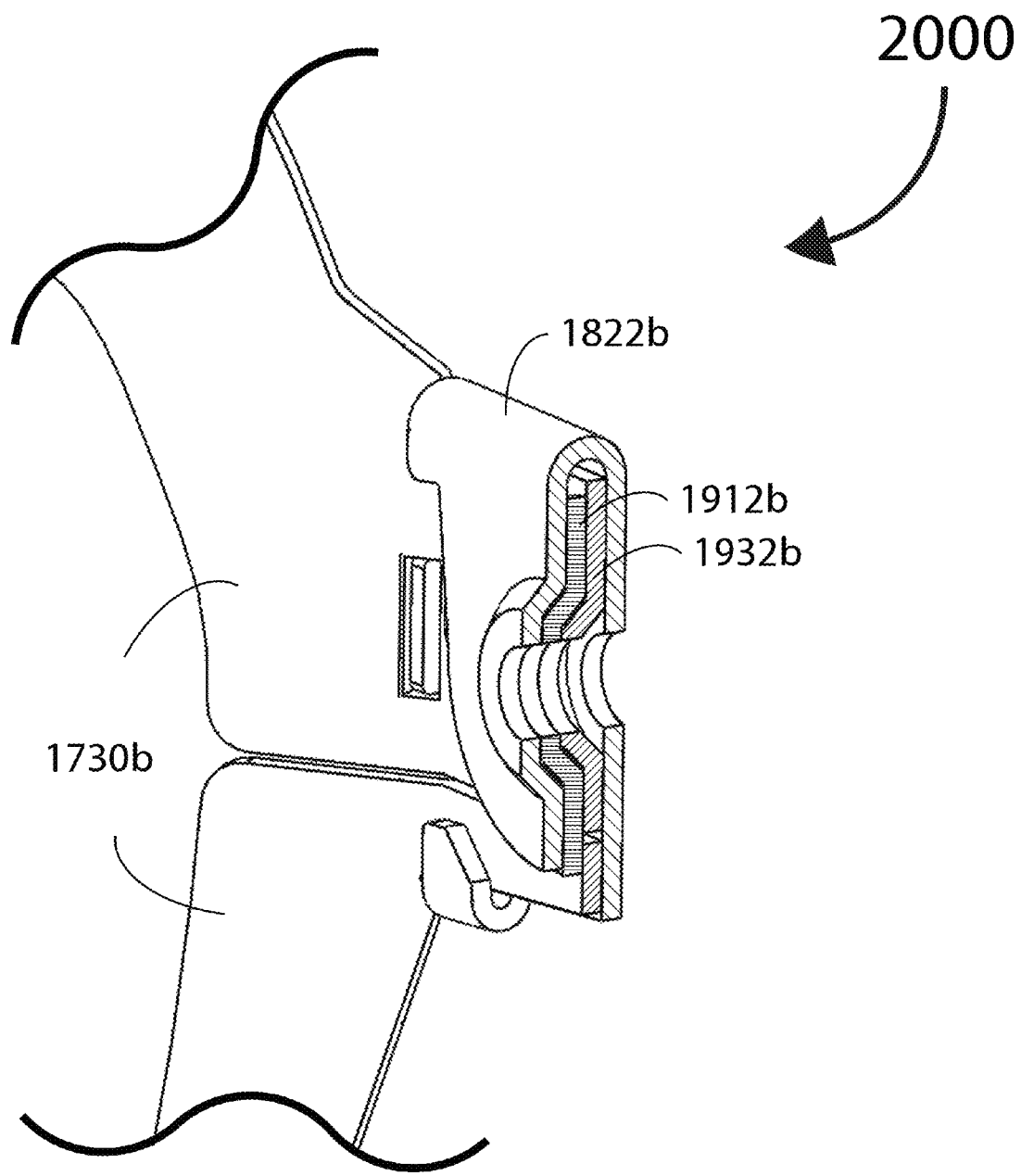
FIG. 20 is a cross-sectional view illustrating the left hinge components of the eyeglasses of FIG. 17.

FIG. 18 is a close-up view of the left hinge 1720b of the eyeglass frame 1700. FIG. 19 is a blown-up view illustrating the left hinge components of the eyeglass frame 1700, while FIG. 20 is a cross-sectional view illustrating the hinge 1720b, dissected along the "E-E" sectional line as shown in FIG. 18. Left hinge 1720b may include a first hinge plate 1932b, a rotary body 1822b and a second hinge plate 1912b. The first hinge plate 1932b may extend from main body 1730b on a vertical plane. The second hinge plate 1912b may extend from temple arm 1710b, and may receive the rotary body 1822b formed in the center thereof. The hinge operation of eyeglass frame 1700 is also similar to the operation of the eyeglass frames described above.

Many modifications and additions to the above described embodiments are also possible. For example, a structure of an eyeglass frame according to some embodiments include an improved nose pad structure to allow an eyeglass not to slide regardless of a nose height. A structure of an eyeglass frame according to another embodiment provides flexibility to the eyeglass frame itself, by modifying a typical structure in which temples are horizontally folded and providing a rotary structure to an earpiece frame corresponding to the tip of the temple. A structure of an eyeglass frame according to yet another embodiment has a simple structure without a screw to remove inconvenience due to a loss of the screw in a hinge structure of a typical eyeglass. Further, it is also possible to mix and match one or more of the features of the embodiments described above to come up with additional permutations of eyeglass frames.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An eyeglass frame with a symmetrical structure, comprising:
    an earpiece frame having a bar-shaped structure in which a width and an angle thereof vary according to the length thereof to be placed on an ear of a user;
    a main body connected to the earpiece frame through a hinge, serving as a pivot that pivots on the hinge, and having an inner circumference of a closed curve receiving a lens;
    the hinge allowing the earpiece frame to be inwardly folded toward the main body through pivoting of a predetermined angle;
    a support frame disposed under the main body along an outer circumference of the main body and spaced from the main body by a predetermined interval, and
    an extension member extending from a center of a lower end of the support frame and connected to a nose pad, wherein the extension member has a vertical length of about 1 mm to about 2 mm, wherein the nose pad is connected to a lower end of the extension member, and has a parabolic shape in which a start point and an end point thereof are downwardly located at both sides of the extension member, respectively, and wherein a curvature of a portion of the nose pad supported by the nose is greater than a curvature of an outer circumference at a lowermost portion of the main body bridge.

2. The eyeglass frame of claim 1, wherein the nose pad is configured such that an orientation thereof is adjustable forward or backward about the extension member, and a width of the parabolic shape thereof is adjustable in order to adjust a nose height.

3. An eyeglass frame with a symmetrical structure, comprising:
    an earpiece frame having a bar-shaped structure in which a width and an angle thereof vary according to the length thereof to be placed on an ear of a user;
    a main body connected to the earpiece frame through a hinge, serving as a pivot that pivots on the hinge, and having an inner circumference of a closed curve receiving a lens;
    the hinge allowing the earpiece frame to be inwardly folded toward the main body through pivoting of a predetermined angle;
    a support frame disposed under the main body along an outer circumference of the main body and spaced from the main body by a predetermined interval; and
    wherein the hinge comprises:
        a first hinge plate extending from the earpiece frame and having a rotary hole formed at a center thereof;
        a second hinge plate extending from the main body and having a rotary hole formed at a center thereof;
        a first elastic slit formed by partially cutting the first hinge plate at a point where a first rotary member inserted into the rotary hole of the first hinge plate is disposed and preventing the point where the first rotary member is disposed from being damaged by an external force during a rotation of the first rotary member; and
        a second elastic slit formed by partially cutting the second hinge plate at a point where a second rotary member inserted into the rotary hole of the second hinge plate is disposed and preventing the point where the second rotary member is disposed from being damaged by an external force during a rotation of the second rotary member.

4. The eyeglass frame of claim 3, wherein the predetermined angle is about 360 degrees.

5. The eyeglass frame of claim 4, wherein when the eyeglass frame is placed on a horizontal plane, the first rotary member is inserted into a lower end portion of the rotary hole of the second hinge plate to allow the first hinge plate to adhere closely to the second hinge plate.

6. The eyeglass frame of claim 3, wherein when the eyeglass frame is placed on a horizontal plane, the second rotary member is inserted into an upper end portion of the rotary hole of the second hinge plate to allow the first hinge plate to adhere closely to the second hinge plate.

7. An eyeglass frame with a symmetrical structure, comprising:
   an earpiece frame having a bar-shaped structure in which a width and an angle thereof vary according to the length thereof to be placed on an ear of a user;
   a main body connected to the earpiece frame through a hinge, serving as a pivot that pivots on the hinge, and having an inner circumference of a closed curve receiving a lens;
   the hinge allowing the earpiece frame to be inwardly folded toward the main body through pivoting of a predetermined angle;
   a support frame disposed under the main body along an outer circumference of the main body and spaced from the main body by a predetermined interval; and
   wherein the hinge comprises:
      a first hinge plate extending from the earpiece frame and having a rotary hole formed at a center thereof;
      a second hinge plate extending from a lower portion of the main body on a vertical plane and connected to a first extension plate that is inwardly folded; and
      a third hinge plate spaced from the second hinge plate on a vertical plane, extending from an upper end portion of the main body, and connected to a second extension plate that is inwardly folded, and
      the first hinge plate and the second extension plate are sequentially stacked on a rear surface of the first extension plate and a center of the first extension plate is penetrated by a rotary body disposed in the first hinge plate.

8. The eyeglass frame of claim 7, wherein the rotary body penetrates the third hinge plate.

9. The eyeglass frame of claim 7, wherein the predetermined angle is about 180 degrees.

10. An eyeglass frame with a symmetrical structure, comprising:
   an earpiece frame having a bar-shaped structure in which a width and an angle thereof vary according to the length thereof to be placed on an ear of a user;
   a main body connected to the earpiece frame through a hinge, serving as a pivot that pivots on the hinge, and having an inner circumference of a closed curve receiving a lens;
   the hinge allowing the earpiece frame to be inwardly folded toward the main body through pivoting of a predetermined angle;
   a support frame disposed under the main body along an outer circumference of the main body and spaced from the main body by a predetermined interval; and
   wherein the hinge comprises:
      a first hinge plate extending from the earpiece frame and having a rotary hole formed at a central portion thereof, and has a shape of a circular rim;
      a second hinge plate extending from the body, and having a rotary hole perforated at a central portion thereof;
      two first rotary members formed in upper portions of an inner circumference of the first hinge plate having the shape of a circular rim, the first rotary members being inserted into the second hinge plate; and
      one second rotary member formed in a lower portion of the inner circumference of the first hinge plate in contrast to the first rotary member, the second rotary member being inserted into the second hinge plate.

* * * * *